(12) United States Patent
Maughan et al.

(10) Patent No.: US 6,644,671 B1
(45) Date of Patent: Nov. 11, 2003

(54) HIGH ARTICULATION DUST BOOT FOR BALL JOINT

(75) Inventors: Garth B. Maughan, Delta, OH (US); Wayne M. Winkler, Berkey, OH (US)

(73) Assignee: Dana Corporation, Toledo, OH (US)

( * ) Notice: Subject to any disclaimer, the term of this patent is extended or adjusted under 35 U.S.C. 154(b) by 56 days.

(21) Appl. No.: 09/874,951

(22) Filed: Jun. 5, 2001

(51) Int. Cl.⁷ .................................................. F16J 3/00
(52) U.S. Cl. ........................ 277/635; 277/636; 464/175
(58) Field of Search ................................ 277/634–636; 464/175; 403/50, 52

(56) References Cited

U.S. PATENT DOCUMENTS

| | | | |
|---|---|---|---|
| 2,197,037 A | | 4/1940 | Gardner |
| 2,971,787 A | | 2/1961 | Lincoln |
| 3,381,987 A | | 5/1968 | Husen |
| 3,511,061 A | * | 5/1970 | Burckhardt ................. 277/636 |
| 3,638,243 A | | 2/1972 | Campbell, Jr. et al. |
| 3,795,118 A | * | 3/1974 | Kesl et al. .................. 464/175 |
| 4,556,399 A | * | 12/1985 | Billet et al. ................. 277/636 |
| 4,556,400 A | * | 12/1985 | Krude et al. ................ 277/636 |
| 4,877,258 A | * | 10/1989 | Alt et al. .................... 277/636 |
| 4,895,550 A | * | 1/1990 | Baker ......................... 277/636 |
| 5,176,390 A | * | 1/1993 | Lallement ................... 277/636 |
| 5,236,394 A | * | 8/1993 | Collins et al. .............. 277/636 |
| 5,251,916 A | * | 10/1993 | Martin et al. ............... 277/636 |
| 5,311,912 A | * | 5/1994 | Hayward .................... 138/121 |
| 5,630,672 A | | 5/1997 | Mc Hale |
| 5,853,178 A | * | 12/1998 | Wydra et al. ............... 277/634 |
| 5,931,777 A | | 8/1999 | Sava |
| 6,062,098 A | | 5/2000 | Spalthoff |
| 6,227,748 B1 | * | 5/2001 | Hayward et al. ........... 277/634 |

\* cited by examiner

Primary Examiner—Anthony Knight
Assistant Examiner—Alison K. Pickard
(74) Attorney, Agent, or Firm—Rader, Fishman & Grauer PLLC

(57) ABSTRACT

An improved dust boot accommodates a ball and socket joint subject to high articulation under harsh environmental conditions of moisture and corrosive contaminants. The improved boot is capable of accommodating articulation of an associated ball stud up to 60 degrees from the rotational center of the joint, as well as twisting motions of the stud of at least 45 degrees. The dust boot includes multiple undulations that feature a series of convolutions or deep folds. In one example, the boot contains at least one undulation that includes two pairs of radially extending ribs so as to present a fully convoluted bulbous loop, complete with reverse bends to maximize amount of material available for stretching when the stud is articulated to high angles. The bulbous loop not only provides for up to 60 degrees of stud articulation but also provides at least 45 degrees of twisting motion without potential deleterious effects.

11 Claims, 3 Drawing Sheets

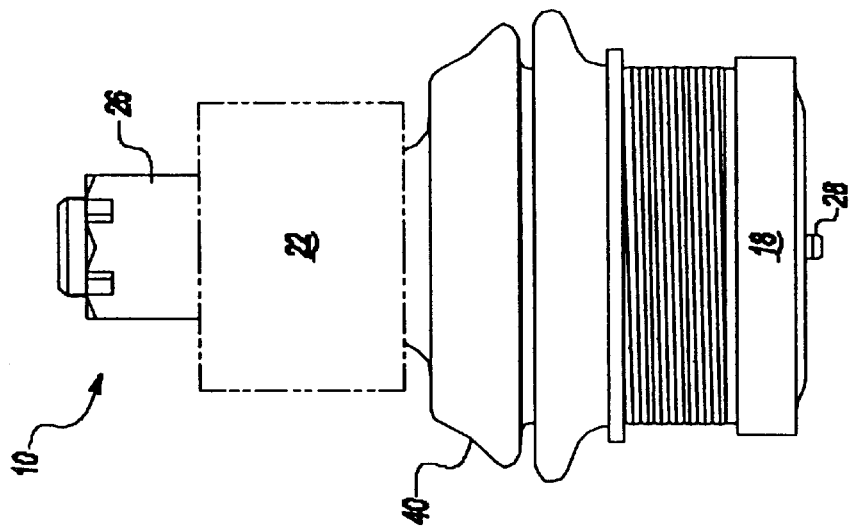
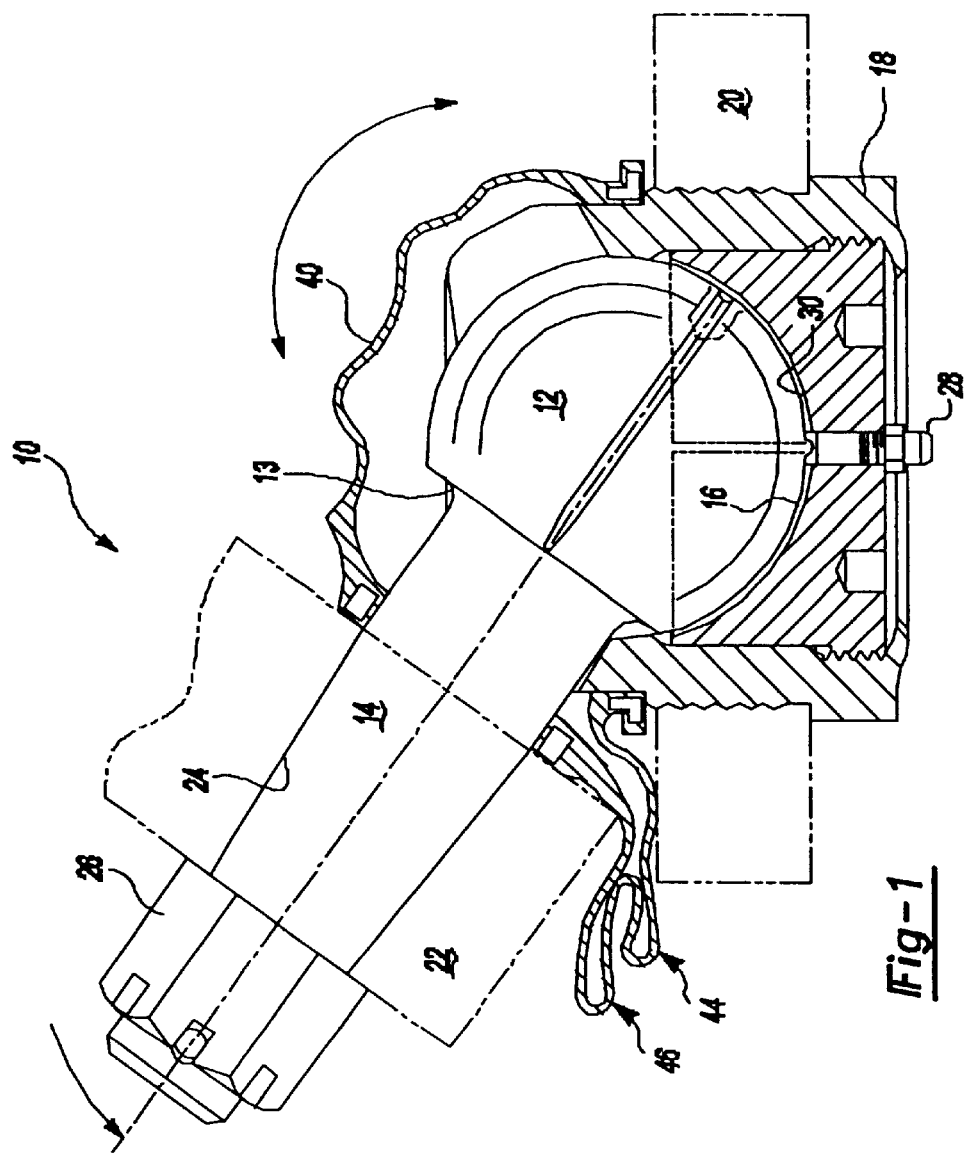

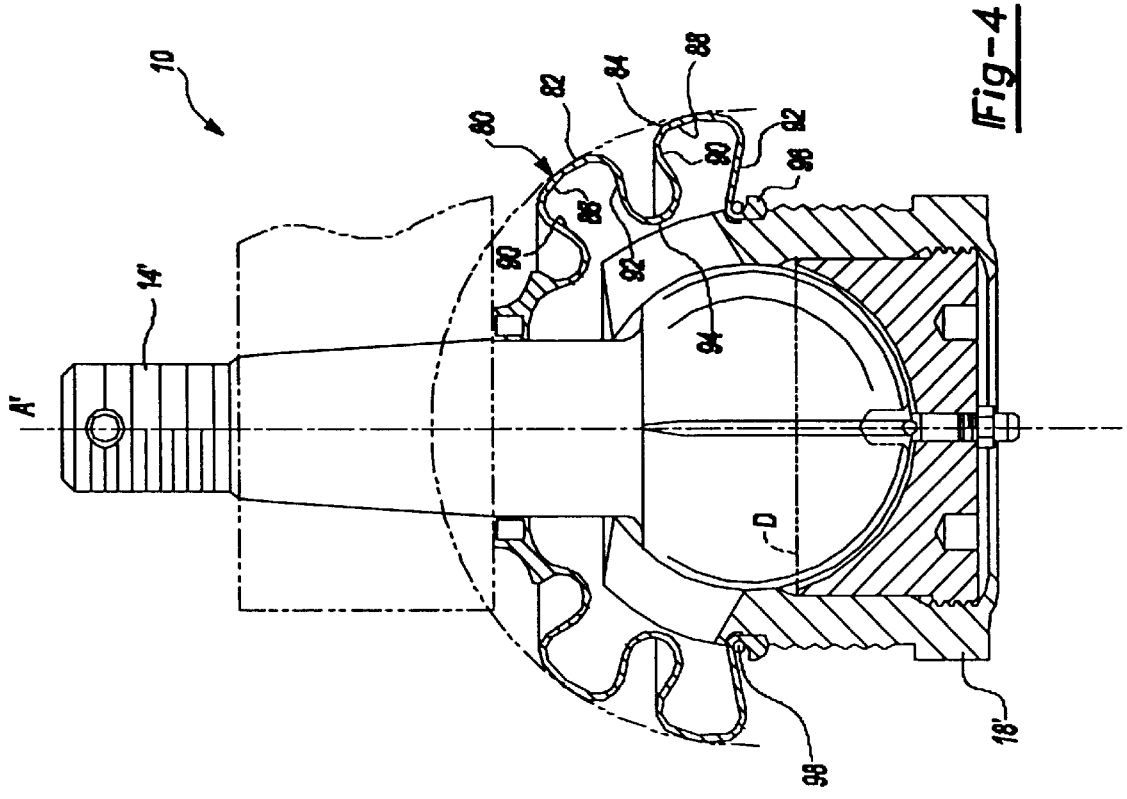
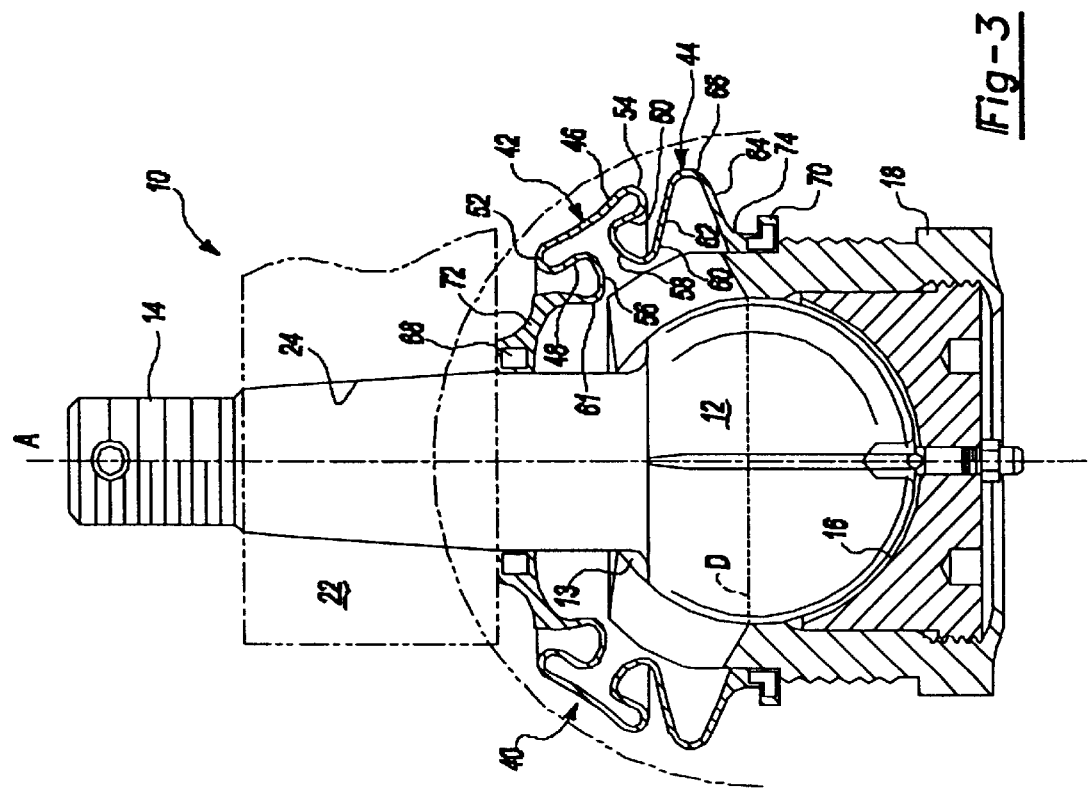

HIGH ARTICULATION DUST BOOT FOR BALL JOINT

BACKGROUND OF THE INVENTION

1. Field of Invention

The present invention relates to ball joints used in suspension systems of vehicles, and particularly to dust boots for ball joints designed for high angles of articulation.

2. Description of the Prior Art

Those skilled in the art will appreciate the typical issues related to longevity of original equipment ball joints employed in suspension and steering systems of vehicles. Many of such applications require the use of protective elastomeric boots, commonly called dust boots or protective caps that are installed over the connected ball joint assembly. Such boots or caps are particularly critical in environments subject to contaminants including dirt and debris. In applications involving high angles of articulation, such as in long or wide swing ball studs, the boots are prone to cracks and or fracture, which in turn leads to premature demise of the ball joint assembly. Usually a failure of a ball joint involves not only replacement of the ball joint; typical requirements call for the associated mating boss part to be replaced as well. Thus premature replacement of ball joint assemblies can be relatively expensive.

In marine (water submersible) applications, the noted issues become potentially exacerbated. For example, an amphibious vehicle is capable of operations both on land and in water. Thus, admission of dust into an exposed ball joint assembly over land, in combination with water entrainment while in water, can be particularly deleterious to a ball joint assembly, and can lead to premature failure, particularly where high ball joint angles of articulation are involved. Moreover, such premature deterioration of the ball joint assembly may be aggravated if the joint is subject to substantial twisting or rotational movements about the longitudinal axis of stud.

SUMMARY OF THE INVENTION

The present invention provides an improved dust boot adapted to accommodate a ball and socket joint for marine applications subject to high articulation under the relatively harsh conditions noted. The improved boot is capable of accommodating an arc of articulation of an associated ball stud up to at least 60 degrees of swivel center of the joint, as well as twisting or rotary motions of the stud of at least 45 degrees from a rotational center. The dust boot includes multiple undulations that feature a series of convolutions or deep folds for this purpose.

In one example, the boot contains at least one undulation that includes two pairs of radially extending ribs so as to provide a convoluted bulbous loop, complete with reverse bends so as to maximize amount of material available for stretching as the stud is articulated to high angles. In addition, the abundance of material provided by the bulbous loops not only provides for the noted stud articulation, but also accommodates the noted rotary motions without potential deleterious effects.

In the same example, the materials used to form the dust boot can include thin thermoplastic polyurethanes, or thermoplastic injection molded or thermoset elastomers. Ideally, the material is waterproof so as to accommodate ball joints used in suspension control arms of water submersible vehicles.

BRIEF DESCRIPTION OF THE DRAWINGS

FIG. 1 is a cross-sectional side view of one embodiment of a ball and socket joint assembly that includes an improved dust boot of the present invention, showed articulated to a full left position.

FIG. 2 is an elevation view of the ball and socket joint assembly of FIG. 1, shown in a centered position or at a zero angle of articulation, wherein the boot is depicted in a fully unstressed state.

FIG. 3 is a cross-sectional side view of a first embodiment of a dust boot for a ball and socket joint assembly capable of high articulation.

FIG. 4 is a cross-sectional side view of a second embodiment of a dust boot for a ball and socket joint assembly capable of high articulation.

DETAILED DESCRIPTION OF THE EMBODIMENTS

Figure 6:
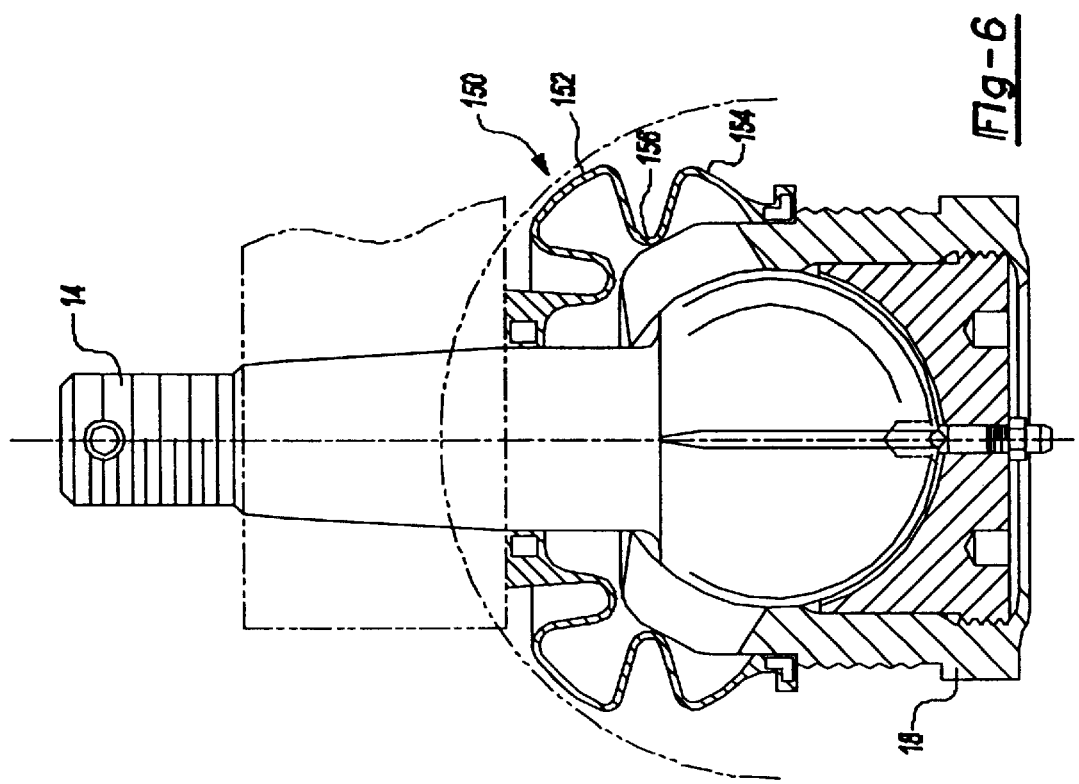
FIG. 6 is a cross-sectional side view of a fourth embodiment of a dust boot for a ball and socket joint assembly capable of high articulation.

Referring initially to FIGS. 1 and 2, a first embodiment of a high articulation ball joint assembly 10 is shown. The assembly 10 includes a ball 12 integrally connected to a stud 14 at an interface 13. The ball 12 oscillates within a socket 16 secured fixedly within a housing 18. The housing 18 is threadedly secured, in turn, to a mounting boss 20. The stud 14, on the other hand, is rigidly secured to a separate oscillating structure 22, such as a tie rod arm that is relatively movable with respect to the mounting boss 20.

A frustoconical aperture 24 in the tie rod arm 22 mates with the frustoconical exterior of the stud 14. A threaded nut 26 captures and retains the tie rod arm 22 in place on the stud 14. A lube fitting 28 accommodates the admission of lubricating grease or fluid into a socket interface region 30 between the ball 12 and socket 16.

An improved dust boot 40 protects the ball and socket joint assembly 10 from harsh environmental conditions involving moisture and corrosive contaminants. The improved boot 40 is capable of accommodating the swiveling articulation of an associated ball stud 14 under high articulation angles up to 60 degrees from the rotational center of the joint 10 (cf. FIGS. 1 and 2), as well as twisting motions of the stud 14 of at least 45 degrees. For this purpose, the dust boot 40 includes multiple undulations that feature a series of convolutions or deep folds, also referred to as loops.

Referring now to FIG. 3, the first embodiment of the dust boot 40 is shown in cross-section, as installed over a ball and socket joint assembly shown unarticulated, i.e. in a centered position or at a zero angle of articulation as in FIG. 2, wherein the boot 40 is depicted in its fully unstressed state. (All reference numerals of FIG. 3 correspond to those of FIGS. 1 and 2.)

The longitudinal axis a-a of the stud 14 is shown relative to the great circle diameter D of the ball 12. The axis of the stud is orthogonal to the great circle diameter at any angle of articulation because the ball 12 and the stud 14 are integrally joined. It will be noted that all of the loops and their associated undulations are angularly offset from the great circle diameter D.

The dust boot 40 includes a pair of adjacently positioned convoluted loops 42 and 44. The loop 42 can be described generally as a circumferentially disposed bulbous band with a generally flat exterior peak segment 46. As defined herein, all "segments", including the segment 46, extend generally circumferentially about the ball 12 in a direction orthogonal to the great circle diameter D.

The loop 44 can be described as a similar bulbous band, but with a generally rounded peak exterior segment 66. The many undulations of the convolutions can be varied according to design limitations required. However, the loop 42 in this particular embodiment contains the segment 46, which can also be described as the radially outermost extremity of the loop 42. Flexibly coupled to the segment 46 are a pair of radially innermost circumferentially extending segments 48 and 50 that are coupled to the segment 46 via a pair of radially extending ribs 52 and 54. A pair of radially extending innermost ribs 56 and 58 defines the lower extremity of the loop.

As described, there are thus two separate pairs of generally parallel radially extending ribs in the loop 42, the ribs 52 and 54 constitute the radially outermost pair of ribs, while the ribs 56 and 58 constitute the radially innermost pair of ribs in the loop 42. The outermost pair of ribs 52, 54 are spaced apart by a first distance and tile innermost pair of ribs 56, 58 are spaced apart by a second distance. The first distance is generally greater than the second distance The multiplicity of convolutions in the loop 42 imparts a substantial amount of material for accommodating the stretching of the boot as required during ball stud articulation.

The next adjacent convoluted loop 44 of the boot 40 has a rounded peak 66 that flexibly couples a pair of radially extending ribs 62 and 64, as shown. Finally, a U-shaped valley 60 situated intermediate the loops 42 and 44 provides an integral flexible inter-connection between the rib 58 of the loop 42 and the rib 62 of the loop 44.

To the extent that there is less material in loop 44, the characteristics of wrap-up of the boot on its compression side during ball stud articulation, i.e. the compressed loops 44 and 46 in FIG. 1, can be desirably controlled.

Continuing reference to FIG. 3, a metal ring reinforced top attachment band 68 is an integral portion of the boot 40 that secures the boot to the stud end of the ball joint 10 at the mounting boss 22. The radial rib 56 of the loop 42 is tied to the band 68 via a U-shaped valley 61. For purposes of strengthening the attachment end of the boot, a thickened portion 72 is immediately adjacent the attachment band 68 for avoiding tears that commonly occur in this particular high stress region of the boot. A similar thickened portion 74 is positioned intermediate the radial rib 64 of loop 44 and the bottom attachment band 70 of the boot 40, as shown. The attachment band 70 provides attachment of the boot 40 to the ball and socket end of the ball joint 10.

Referring now to FIG. 4, a boot 80 is shown as a second embodiment of the present invention, having a pair of nearly identical convolutions or loops 82 and 84. Each of the two loops 82, 84 contains a flat peak segment 86, 88 which extends circumferentially, each being connected by virtually identical radially extending ribs 90 and 92. A U-shaped valley 94 provides an integral flexible inter-connection between the adjacent radial ribs 90 and 92 of the respective loops 82, 84. In this embodiment, it will be noted that the bottom attachment band 96 includes a separate external metal ring retainer 98.

Figure 5:
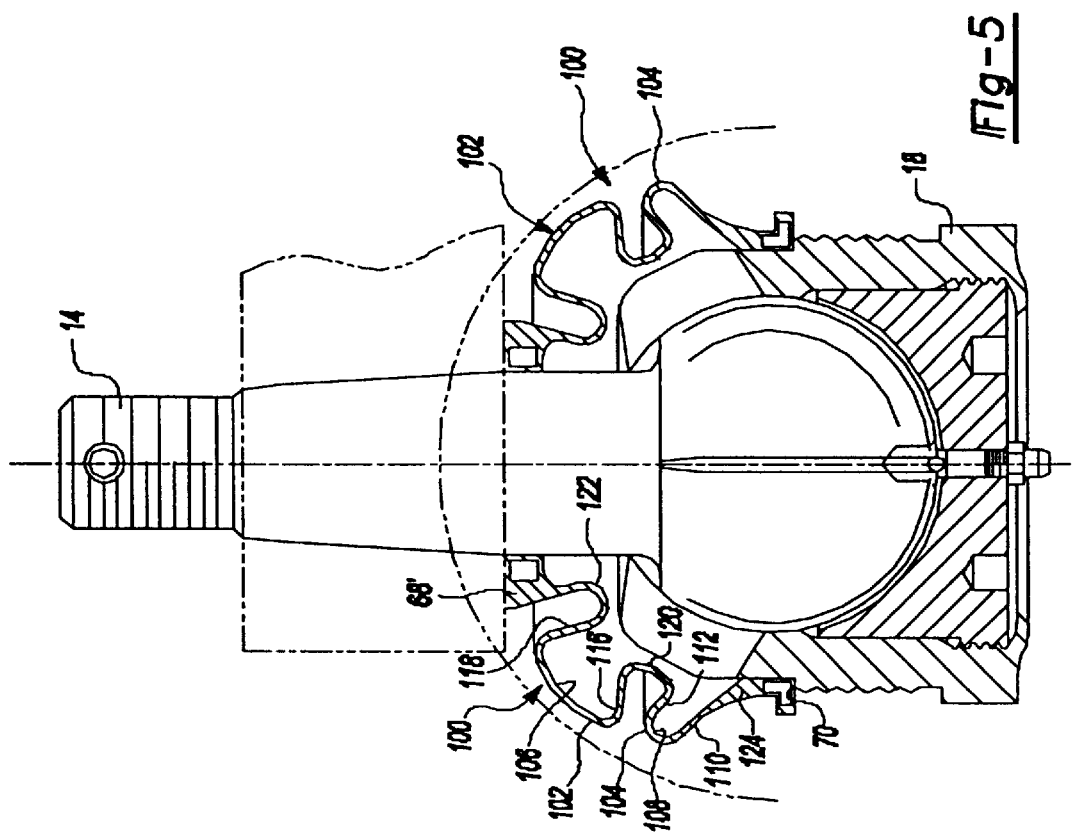
FIG. 5 is a cross-sectional side view of a third embodiment of a dust boot for a ball and socket joint assembly capable of high articulation.

Referring now to FIG. 5, a third embodiment of the boot 100 is displayed. Again, two loops 102 and 104 are included, but the loop cross-sections are different, as they were in the first embodiment. A flat peak segment 106 is provided on the loop 102, and a rounded peak segment 108 is provided on the adjacent loop 104. More specifically, one segment 106 is provided on the loop 102, while one inverted U-shaped segment 108 is provided on the loop 104. The loop 104 is obviously less complex, having a pair of radial ribs interconnected by the flexible inverted U-shaped segment 108. The loop 102 on the other hand includes a pair of radial ribs 116 and 118 that are each flexibly connected to the segment 106. A segment 120, which joins the loops 102 and 104, is a non-U-shaped segment that is useful for providing more material into a particular boot design. In this particular embodiment, the segment 120 is a radially inner cross segment that ties the ribs 112 and 116 together, thus resiliently coupling the loops 102 and 104.

Continuing reference to FIG. 5, a U-shaped integral flexible connection 122 ties the rib 118 of the loop 102 into a top attachment band 68' of a type previously described. A thickened bottom portion 124 of the rib 110 (of loop 104) directly connects the loop 104 to a bottom attachment band 70', of a previously described type.

Finally, referring to FIG. 6, a fourth embodiment is a variation of the third embodiment of the described elastomeric dust boot of the present invention. Specifically, the loops 152 and 154 of FIG. 6 are similar to the corresponding loops 102 and 104, respectively, of FIG. 5. However, a U-shaped valley 156 is employed between the corresponding loops in lieu of the prior described segment 120.

Those skilled in the art will appreciate that the dust boot embodiments 40, 80, 100, and 150 are quite flexible and will accommodate a ball and socket joint designed for high angles of articulation. In most applications the flexible material of the boot will be relatively thin to assure longevity for maximizing useful life of the ball joint. Ideally the material will be waterproof for accommodating ball joints used in suspension control arms of water submersible vehicles. The choice of flexible materials will include thermoplastic polyurethanes, and thermoplastic injection molded or thermoset elastomers.

It is to be understood that the above description is intended to be illustrative and not limiting. Many embodiments will be apparent to those skilled in the art upon reading the above description. The scope of the invention should be determined, however, not with reference to the above description, but with reference to the appended claims with full scope of equivalents to which such claims are entitled.

What is claimed is:

1. A flexible boot for enclosing and sealing the ball and stud interface of a ball and socket joint assembly comprising:
   a) a flexible sheath having multiple undulations defining loops defining collapsible sections in an unstressed state of the boot;
   b) at least one of said undulations having a cross-section that includes a plurality of circumferentially extending segments and radially extending ribs of generally uniform thickness, and wherein each of said segments is contiguously and flexibly joined at each end to its adjacent rib; and
   c) said one undulation comprises a pair of radially outermost ribs and a pair of radially innermost ribs, said outermost ribs being substantially parallel to one another and spaced apart from one another by a first distance, said innermost pair of ribs being also substantially parallel and spaced apart from one another by a second distance, wherein the value of said first distance is greater than the value of said second distance.

2. The flexible boot for enclosing and sealing the ball and stud interface of a ball and socket joint assembly of claim 1 wherein said stud defines an axis, and wherein said ball defines a great circle diameter thereon positioned orthogonally to the axis of said stud of said ball and socket joint, and wherein said one of said undulations in said unstressed state defines an annular band about said ball angularly offset from said great circle diameter of said ball.

3. The flexible boot for enclosing and sealing the ball and stud interface of a ball and socket joint assembly of claim 2 wherein said boot accommodates up to 60 degrees of angular articulation of said stud and at least 45 degrees of twisting of said stud.

4. The flexible boot for enclosing and sealing the ball and stud interface of a ball and socket joint assembly of claim 3 comprising a thermoplastic polyurethane material.

5. The flexible boot for enclosing and sealing the ball and stud interface of a ball and socket joint assembly of claim 4 further comprising integral flexible connections for control of wrap-up of said boot along its arc of compression, as said stud is angularly articulated and said boot is moved from its unstressed state.

6. The flexible boot for enclosing and sealing the ball and stud interface of a ball and socket joint assembly of claim 2 wherein a rotational center is defined by the orthogonal intersection of said axis of said stud and said great circle diameter of said ball and said boot accommodates at least 40 degrees of angular articulation of said stud from said rotational center and at least 45 degrees of twisting of said stud.

7. A flexible boot for enclosing and sealing the ball and stud interface of a ball and socket joint assembly comprising:
   a) a flexible sheath having at least a pair of undulations defining loops with collapsible cross-sections in an unstressed state of said boot;
   b) each of said cross-sections including a circumferentially extending segment and a pair of radially extending ribs of generally uniform thickness, and wherein said segment is contiguously and flexibly joined at each end to its adjacent rib; and
   c) said pair of undulations are joined together by a U-shaped integral flexible connection, and wherein;
   d) said stud of said ball and socket joint defines an axis, and said ball defines a great circle diameter thereon positioned orthogonally to the axis of said stud, and wherein said one of said undulations in said unstressed state defines an annular band about said ball angularly offset from said great circle diameter of said ball.

8. The flexible boot for enclosing and sealing the ball and stud interface of a ball and socket joint assembly of claim 7 comprising a thermoplastic polyurethane material.

9. A flexible boot for enclosing and sealing the ball and stud interface of a ball and socket joint assembly comprising:
   a) a flexible sheath having multiple undulations defining loops with collapsible sections;
   b) at least one of said undulations in an unstressed state having a cross-section that includes a circumferentially extending segment and a pair of radially extending ribs of generally uniform thickness, and wherein each of said segments is contiguously joined to its adjacent rib; and wherein
   c) one of said pair of ribs adjoins a U-shaped integral flexible connection, and wherein the other of said pair of ribs is connected to a non-U-shaped segment.

10. The flexible boot for enclosing and sealing the ball and stud interface of a ball and socket joint assembly of claim 9 wherein said ball defines a great circle diameter thereon positioned orthogonally to the stud of said ball and socket joint, and wherein said one of said undulations in said unstressed state defines an annular band about said ball angularly offset from said great circle diameter of said ball.

11. The flexible boot for enclosing and sealing the ball and stud interface of a ball and socket joint assembly of claims 10 comprising a thermoplastic polyurethane material.

* * * * *